US012798093B2

(12) United States Patent
Haaf et al.

(10) Patent No.: US 12,798,093 B2
(45) Date of Patent: Nov. 17, 2026

(54) METHOD FOR CONTROLLING THE OPERATION OF A MACHINE

(71) Applicant: Gerhard Schubert GmbH, Crailsheim (DE)

(72) Inventors: Volker Haaf, Crailsheim (DE); Daniel Greb, Crailsheim (DE)

(73) Assignee: GERHARD SCHUBERT GMBH, Crailsheim (DE)

( * ) Notice: Subject to any disclaimer, the term of this patent is extended or adjusted under 35 U.S.C. 154(b) by 573 days.

(21) Appl. No.: 17/998,751

(22) PCT Filed: May 10, 2021

(86) PCT No.: PCT/EP2021/062344
§ 371 (c)(1),
(2) Date: Nov. 14, 2022

(87) PCT Pub. No.: WO2021/228772
PCT Pub. Date: Nov. 18, 2021

(65) Prior Publication Data

US 2023/0234226 A1 Jul. 27, 2023

(30) Foreign Application Priority Data

May 15, 2020 (DE) ..................... 10 2020 113 275.1

(51) Int. Cl.
*B25J 9/16* (2006.01)
*G05B 19/406* (2006.01)

(52) U.S. Cl.
CPC .......... *B25J 9/1661* (2013.01); *G05B 19/406* (2013.01); *G05B 2219/33109* (2013.01);
(Continued)

(58) Field of Classification Search
CPC ......... B25J 9/1661; G05B 2219/40099; G05B 19/406; G05B 2219/35283; G05B 2219/45048
See application file for complete search history.

(56) References Cited

U.S. PATENT DOCUMENTS

2014/0298231 A1* 10/2014 Saito ..................... G06F 3/0484 715/771
2015/0273685 A1* 10/2015 Linnell .................. B25J 9/1664 901/41
(Continued)

FOREIGN PATENT DOCUMENTS

DE 202008003348 U1 7/2009
DE 102010012598 A1 9/2011
(Continued)

OTHER PUBLICATIONS

International Search Report and Written Opinion dated Jul. 23, 2021, pertaining to Int'l Patent Application No. PCT/EP2021/062344, 11 pgs.

*Primary Examiner* — Wade Miles
*Assistant Examiner* — Mohammed Yousef Abuelhawa
(74) *Attorney, Agent, or Firm* — DINSMORE & SHOHL LLP

(57) ABSTRACT

Method for controlling the operation of at least one machine (1), which is in particular configured to carry out pick-and-place or singulation tasks on objects (2), wherein the machine (1) comprises at least one functional device that comprises at least one functional element for carrying out at least one task, wherein the operation of the machine (1) is controlled on the basis of control information in order to carry out the at least one task, wherein the control information is generated on the basis of a plurality of task parameter types (APT) that relate to the operation of the machine (1) in order to carry out the task, wherein the task parameter
(Continued)

types (APT) are stored on at least one data storage device (10) in a linked manner on the basis of predefined links specific to the task parameter types.

17 Claims, 10 Drawing Sheets

(52) U.S. Cl.
CPC .............. *G05B 2219/35283* (2013.01); *G05B 2219/40099* (2013.01); *G05B 2219/45048* (2013.01)

(56) References Cited

U.S. PATENT DOCUMENTS

| | | | | |
|---|---|---|---|---|
| 2016/0332299 | A1* | 11/2016 | Suzuki | B25J 9/1697 |
| 2017/0369244 | A1* | 12/2017 | Battles | B65G 47/902 |
| 2018/0354141 | A1* | 12/2018 | Haddadin | B25J 9/0081 |
| 2019/0030712 | A1* | 1/2019 | Sciog | B25J 9/1661 |
| 2019/0344443 | A1* | 11/2019 | Hazan | G05B 19/402 |
| 2019/0351548 | A1* | 11/2019 | Morey | B25J 19/007 |

FOREIGN PATENT DOCUMENTS

| | | | |
|---|---|---|---|
| DE | 102014000972 | A1 | 7/2014 |
| DE | 102015012961 | A1 | 4/2017 |
| WO | WO-2019021044 | A1 * | 1/2019 |

* cited by examiner

METHOD FOR CONTROLLING THE OPERATION OF A MACHINE

CROSS-REFERENCE TO RELATED APPLICATIONS

This application is a national stage entry of PCT/EP2021/062344 filed May 10, 2021, which claims the benefit of German Patent Application No. DE 10 2020 113 275.1 filed May 15, 2020, the entire disclosures of which are hereby incorporated herein by reference.

FIELD

The present disclosure relates to a method for controlling the operation of at least one machine, which is in particular configured to carry out pick-and-place or singulation tasks on objects, wherein the machine comprises at least one functional device that comprises at least one functional element for carrying out at least one task, wherein the operation of the at least one machine is controlled on the basis of control information in order to carry out the at least one task.

BACKGROUND

Corresponding methods for controlling the operation of machines configured, for example, for carrying out pick-and-place or singulation tasks on objects are essentially known from the prior art in various embodiments and are typically based on generating control information on the basis of which the operation of the respective machines to be controlled is controlled for carrying out specific tasks.

In this case, corresponding control information is typically different for different tasks to be carried out, so that corresponding control information typically has to be generated separately for different tasks to be carried out.

The separate generation of corresponding control information can be associated with a considerable amount of work, so that there is a fundamental need for a principle that enables the simple generation of corresponding control information and, associated with this, a simplified principle for controlling the operation of a machine.

SUMMARY

On this basis, the object underlying the disclosure is to specify a simplified principle for controlling the operation of a machine.

The object is achieved by a method for controlling the operation of a machine according to claim 1. The claims dependent thereon relate to possible embodiments of the method.

A first aspect of the disclosure relates to a method for controlling the operation of one machine or a plurality of machines, in particular configured to carry out pick-and-place or singulation tasks on objects, wherein the machine(s) respectively comprise(s) at least one functional device that comprise(s) at least one functional element for carrying out at least one task, wherein the operation of the machine(s) is controlled on the basis of control information in order to carry out the at least one task.

A machine that can be controllable or controlled according to the method can be, for example, an industrial robot and/or a peripheral device that can be assigned or is assigned to an industrial robot.

A corresponding industrial robot can be configured for carrying our pick-and-place or singulation tasks, for example, for transferring an object to be transferred from a first spatial orientation and/or position to a second spatial orientation and/or position. A correspondingly configured industrial robot can comprise as a functional device at least one handling device that can optionally also be called an end effector device and that comprises as a functional element at least one handling element that can optionally also be called an end effector element and that can be moved in at least one degree of freedom of movement, i.e. a gripping element, suctioning element, etc.

A corresponding peripheral device can, for example, be formed as or comprise a feed device for feeding objects, in particular objects located in a first orientation and/or position, into an action area of the industrial robot, i.e. in particular in at least one handling element of a handling device of the industrial robot. A corresponding feed device can comprise at least one conveying element (feed element), e.g. a belt-like or chain-like element. Alternatively or additionally, a corresponding peripheral device can be designed as or comprise an outlet device for the outlet of objects, in particular objects that have been transferred to the second orientation and/or position by means of the industrial robot. A corresponding outlet device can comprise at least one conveying element (outlet element), e.g. a belt-like or chain-like element.

A corresponding machine can therefore be a packaging machine, for example, for packaging objects or form a component of such. A corresponding packaging machine can, for example, be configured to transfer objects from a first orientation and/or position into a second orientation and/or position, i.e. into a carrier-like receiving device, for example.

Regardless of its specific embodiment or configuration, the operation of the corresponding machine to carry out the at least one task is controlled based on control information. The operation of the machine is therefore based on control information, on the basis of which the machine, in particular partially or fully automated, carries out the at least one task—this can be, as mentioned, a pick-and-place or singulation task on objects, for example. The corresponding control information is typically data that can be processed by data processing or computer-aided processing. In particular, corresponding control information is machine-readable data, e.g. in the form of CNC codes, G codes, opcodes, assembler codes, etc.

The control information can be generated, for example, via a control device that can be assigned or is assigned to the respective machine and is implemented in hardware and/or software. A corresponding control device can, for example, be configured as a local or global computer device or comprise such a device.

The control information is generated according to the method on the basis of a plurality of task parameter types. The generation of control information is therefore based on output task parameter types, on the basis of which control information is generated for carrying out one or a plurality of specific tasks. The corresponding task parameter types are data that can be processed by data processing or computer-aided processing, which describe one or more task parameter types relating to the operation of the respective machine for carrying out the respective task. Specific examples of corresponding task parameter types are given below.

Respective task parameter types relate to or describe the operation of the machine to carry out a respective task. A task to be actually carried out during operation of a respective machine on the basis of respective control information can therefore be described at least partially, or if necessary completely, by the task parameter types. Each task parameter type can relate to one or a plurality of sub-aspects of a task to be carried out.

The number of respective task parameter types can be the same or different for different tasks or task classes in which the same or similar, but possibly different tasks to be achieved are grouped. Accordingly, a first task or task class can be described by a first number of task parameter types and another task or task class by a different number of task parameter types. Although complex tasks or task classes can typically be described by a higher number of task parameter types compared to less complex tasks or task classes, the degree of complexity of a respective task or task class is not necessarily a measure for the number of task parameter types concerning the respective task or task class.

A feature of the method in some embodiments is that task parameter types are stored linked to each other on the basis of predefined task parameter type-specific links—these are typically data links—in at least one data storage device implemented in hardware and/or software. The task parameter types are therefore available as data linked together in a predefinable or predefined manner on the basis of corresponding predefinable or predefined task parameter type-specific links. Thus, each task parameter type is linked to at least one further task parameter type via corresponding predefinable or predefined task parameter type-specific links in a predefinable or predefined manner. The predefinable or predefined task parameter type-specific links of the respective task parameter types are typically generated on the basis of link criteria. Corresponding link criteria are typically selected such that they enable, for example, a meaningful link of task parameter types for a specific task or task class.

The respective predefined task parameter type-specific links of respective task parameter types typically cannot be changed by a user of the method, i.e. a person who wants to implement or program a control of the operation of a respective machine, for example. This is a particular advantage of the method, as a user or operator of the method can carry out implementation or programming of a control of the operation of a respective machine solely by selecting certain task parameter types linked in a predefined manner. This means that the implementation or programming of a control system for the operation of a respective machine can be carried out in a simple manner.

An improved method for controlling the operation of a machine is therefore provided.

The following are non-exhaustive examples of possible task parameter types:

A task parameter type can, for example, relate to at least one functional element of the functional device to be used for carrying out a respective task. By selecting a corresponding task parameter type, at least one functional element of the functional device of the respective machine to be used for carrying out a respective task can therefore be defined. A corresponding task parameter type can be a first task parameter type of a predefinable or predefined query and/or selection sequence described in more detail below.

Alternatively or additionally, a task parameter type can relate to at least one object, in particular at least one object to be transferred from a first state, i.e. in particular from a first orientation and/or position, to at least one further state, i.e. in particular to a further orientation and/or position, when carrying out a respective task. By selecting a corresponding task parameter type, at least one object to be transferred from a first state to a further state during the execution of a respective task can be defined. A corresponding task parameter type can be a first or second task parameter type of the predefinable or predefined query and/or selection sequence described in more detail below.

Alternatively or additionally, a task parameter type can relate to at least one action to be carried out before carrying out the respective task. An action to be carried out before carrying out a respective task can be, for example, a detection of an object, wherein the task parameter type describes in particular at least one object detection parameter relating to the detection of at least one object to be transferred from a first state to at least one further state by means of a detection device within the context of carrying out the task. A corresponding object detection parameter can, for example, be: “vision system”, “static position”, etc. Alternatively or additionally, an action to be carried out before carrying out the task can be a feed of at least one object to be transferred from a first state into at least one further state within the context of the task, wherein the task parameter type describes in particular at least one object feed parameter relating to the feed of an object, in particular into an action area of the at least one industrial robot. A corresponding object feed parameter can, for example, be: “product bunker, “pick-up from belt”, “pick-up from tray”, etc. A corresponding task parameter type can be a first or second or third task parameter type of the predefinable or predefined query and/or selection sequence described in more detail below.

Alternatively or additionally, a task parameter type can relate to at least one action to be carried out after carrying out the respective task. An action to be carried out after carrying out a respective task can be, for example, a detection of an object, wherein the task parameter type describes in particular at least one object detection parameter relating to the detection of at least one object transferred from a first state to at least one further state by means of a detection device within the context of carrying out the task. A corresponding object detection parameter can, for example, be: “vision system”, “static position”, etc. Alternatively or additionally, an action to be carried out after carrying out the task can be a placing of at least one object transferred from a first state into at least one further state within the context of the task, wherein the task parameter type describes in particular at least one object placing parameter relating to the placing of an object, in particular in at least one placing area. A corresponding object placing parameter can, for example, be: “product bunker, “pick-up from belt”, “pick-up from tray”, etc. A corresponding task parameter type can be a first or second or third or fourth task parameter type of the predefinable or predefined query and/or selection sequence described in more detail below.

As mentioned, the predefinable or predefined task parameter type-specific links are typically generated based on link criteria. Examples of possible link criteria are provided in the following:

A link criterion can be, for example, a compatibility or plausibility criterion. The task parameter type-specific links can therefore be generated on the basis of at least one compatibility or plausibility criterion that describes an, in particular technical, compatible or plausible link of a first task parameter type with at least one further task parameter type. In this way, it can be ensured that (only) compatible or plausible task parameter types can be linked and selected to generate control information and that incompatible or implausible task parameter types cannot be linked and selected to generate control information.

Furthermore, a link criterion can be a hierarchy criterion. The predefined task parameter type-specific links can therefore be generated on the basis of at least one hierarchy criterion that describes a hierarchically ordered link of a first task parameter type with at least one further task parameter type. In this way, it can be ensured that (only) hierarchically ordered task parameter types can be linked and selected to generate control information and that non-hierarchically ordered task parameter types cannot be linked and selected to generate control information.

Furthermore, a link criterion can be a safety criterion. The predefined task parameter type-specific links can therefore be generated on the basis of at least one safety criterion, which describes an ordered linking of a first task parameter type to at least one further task parameter type with regard to safety-relevant aspects of the operation of a respective machine, e.g. in connection with a possible damage or danger potential of users, objects, other machines, etc. In this way, it can be ensured that (only) task parameter types can be linked and selected to generate control information if these or their linking would result in safe operation of the machine, and task parameter types cannot be linked and selected to generate control information if these or their linking would not result in safe operation of the respective machine. A corresponding safety criterion can be defined on the basis of one or a plurality of safety limit values. Corresponding safety limit values can be defined with regard to a possible damage or danger potential of users, objects, other machines, etc.

Furthermore, a link criterion can be an efficiency criterion. The predefined task parameter type-specific links can therefore be generated on the basis of at least one efficiency criterion that describes a link of a first task parameter type to at least one further task parameter type ordered with regard to efficiency-relevant aspects of the operation of a respective machine. In this way, it can be ensured that (only) task parameter types can be linked and selected to generate control information if these or their linking would result in efficient operation of the respective machine—this can be, for example, efficient operation of the machine with regard to the energy, time, etc. required to carry out the respective task—and task parameter types cannot be linked and selected to generate control information if these or their linking would not result in efficient operation of the machine. A corresponding efficiency criterion can be defined on the basis of one or a plurality of efficiency limit values.

In embodiments of the method, the task parameter type linked via predefined task parameter type-specific links can be output to a user via at least one output device in at least one item of output information containing the predefined task parameter type-specific links, in particular optically or visually depicting them. Corresponding output information can form a (graphical) user interface (GUI) or a component of such. A corresponding user interface can include, for example, a tree structure that maps the predefined task parameter type-specific links of the task parameter types for at least one specific task.

A corresponding output device can, for example, be an optical output device; the task parameter types linked via predefined task parameter type-specific links can therefore be output to a user of the method as optical or visual output information via an optical output device. An optical output device, which can be a display, touch display, etc., can be a functional or structural component of the respective machine. It is also conceivable that an optical output device is a component of a user or user-side (mobile) terminal, such as a computer, in particular a laptop, smartphone, tablet, etc. The same applies to the equally conceivable case in which the task parameter types linked via predefined task parameter type-specific links are output to a user of the method as acoustic output information.

In embodiments, an output of corresponding output information can also be understood as a transmission of this to one or more communication partners. The transmission of corresponding output information can be realized via wired or wireless data transmission connections. A corresponding communication partner can in turn be, for example, a user or user-side (mobile) terminal device, such as a computer, in particular a laptop, a smartphone, a tablet, etc. It is also conceivable that a communication partner is a server connected to a local or global communication network.

The task parameter type linked via predefined task parameter type specific links can be output to an operator or a user, as indicated, for query and/or selection via at least one output device in a predefinable or predefined query and/or selection sequence. In this embodiment, optical output devices are typically used via which the task parameter type linked via predefined task parameter type-specific links are output for query and/or selection via at least one output device in a predefinable or predefined query and/or selection sequence.

In a conceivable embodiment, a corresponding output comprises the task parameter types in the predefinable or predefined query and/or selection sequence, e.g. the following steps of:

outputting a number of first task parameter types via the at least one output device, selecting a particular first task parameter type from the number of first task parameter types output via the at least one output device;

outputting a number of further task parameter types linked to the first task parameter types via the at least one output device; and selecting a particular further task parameter type from the number of further task parameter types output via the at least one output device. Corresponding further task parameter types can have a lower position in the query and/or selection sequence compared to first task parameter types.

For example, at least one selection menu, such as a drop-down menu, can be generated and output for querying and/or selecting respective task parameter types linked on the basis of the task parameter type-specific links. Consequently, the query and/or selection of the respective task parameter types can be carried out via intuitively operable selection menus. A selection menu, such as a drop-down menu, can form part of a (graphical) user interface (GUI) in connection with a visual output of the task parameter types via a visual output device.

In a conceivable further development of the embodiment, the output of the task parameter types in the predefinable or predefined query and/or selection sequence, can for example comprise the following steps:

outputting a number of first task parameter types via the at least one output device, selecting a particular first task parameter type from the number of first task parameter types output via the at least one output device;

outputting a number of second task parameter types linked to the first task parameter types via the at least one output device;

selecting a particular second task parameter type from the number of second task parameter types output via the at least one output device;

outputting a number of third output parameter types linked to the second output parameter types via the at least one output device;

selecting a particular third task parameter type from the number of third task parameter types output via the at least one output device.

This principle can be continued in any way.

As already mentioned, a plurality of machines can also be controlled according to the method. In this case, the control of the plurality of machines for respectively carrying out at least one task is controlled based on control information. The respective control information is generated based on a plurality of task parameter types relating to the operation of the plurality of machines to carry out the respective at least one task. In the case of the control of a plurality of machines, a number of first task parameter types relate to the operation of the at least one first machine for carrying out the task to be carried out by means of the at least one first machine, and a number of further task parameter types relate to the operation of at least one further machine for carrying out the task to be carried out by means of the at least one further machine, wherein the further task parameter types are linked to the first task parameter types on the basis of predefined task parameter type-specific links.

As mentioned, a machine can be an industrial robot. A corresponding industrial robot can in particular be a collaborative industrial robot ("cobot"). A corresponding collaborative industrial robot can comprise at least one handling device comprising, for example, at least one handling element movable in at least one degree of freedom of movement for handling an object to be transferred from a first orientation and/or position to a second orientation and/or position.

A second aspect of the disclosure relates to a machine for carrying out tasks, in particular pick-and-place or singulation tasks of objects, in particular comprising at least one industrial robot, in embodiments a collaborative industrial robot ("cobot"). The machine comprises at least one functional device, which comprises at least one functional element or at least one functional element group for carrying out at least one task, and at least one control device, in particular implemented in hardware and/or software, for controlling the operation of the machine on the basis of control information. The control device is configured for performing the method according to a first aspect of the disclosure. Embodiments in connection with the method according to the first aspect of the disclosure therefore apply analogously to the machine according to the second aspect of the disclosure and vice versa.

The machine can therefore comprise at least one industrial robot and at least one peripheral device that can be assigned or is assigned to it, in particular in the form of a feed device for feeding objects into an action area of at least one functional element of a functional device of the at least one industrial robot or of the machine, and/or an outlet device for the outlet of objects, in particular from an action area of the at least one functional element of a functional device of the at least one industrial robot or of the machine.

The machine can in particular be designed as a packaging machine for packaging objects or form a component of such. A corresponding packaging machine can, for example, be configured to transfer objects, such as foodstuffs, cosmetic articles, pharmaceutical articles, technical articles, from a first orientation and/or position into a second orientation and/or position, i.e. into a carrier-like receiving device, for example.

BRIEF DESCRIPTION OF THE DRAWINGS

The disclosure is explained in more detail in the drawings with reference to exemplary embodiments. The drawings show in.

DETAILED DESCRIPTION

Figure 1:
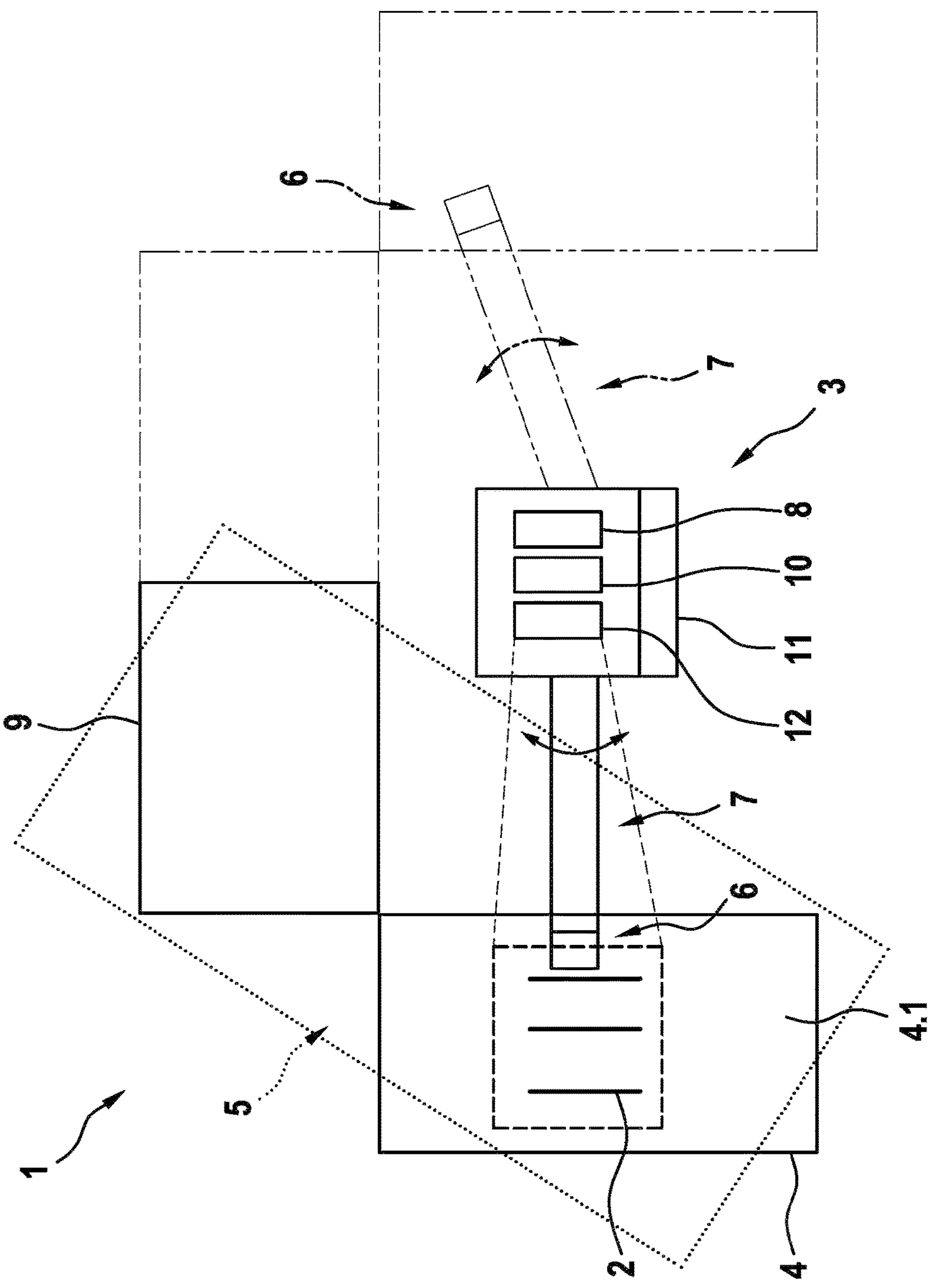
FIG. 1 a schematic diagram of a machine according to an exemplary embodiment.

FIG. 1 a schematic diagram of a machine 1 according to an exemplary embodiment in a top view.

The machine 1 is configured, for example, to transfer objects 2 from a first orientation and/or position to a second orientation and/or position.

The machine 1 comprises an industrial robot 3, e.g. designed as a collaborative industrial robot ("cobot"), and a plurality of peripheral devices. In the exemplary embodiment, the peripheral devices are a feed device 4, for example in the form of a feed belt, for feeding objects 2, in particular objects 2 in a first orientation and/or position, into an action area 5 of an end effector or handling element 6 of an end effector or handling device 7 of the industrial robot 3, e.g. designed as a gripping or suctioning element, and an outlet device 9, for example in the form of a outlet belt, for the outlet of objects 2, in particular objects 2 transferred to a second orientation and/or position by means of the industrial robot.

In dashed illustration it is indicated that the machine 1 can also comprise a plurality of corresponding peripheral devices as well as a plurality of corresponding end effector or handling devices 7 together with the associated end effector or handling element 6.

The machine 1 also comprises a control device 8 implemented in hardware and/or software, which is configured to control the operation of the machine 1 or of individual, a plurality of or all components of the machine 1, i.e. in particular the industrial robot 3. The control device 8 shown in FIG. 1 purely as an example as a structural component of the industrial robot 3 is thus configured to generate control information on the basis of which the operation of the machine 1, i.e. in particular of the industrial robot 3, is controlled for carrying out certain tasks or assignments. In the case of corresponding tasks or assignments, as mentioned, it can be a matter, for example, of pick-and-place or singulation tasks on objects 2, in which objects 2 are transferred from a first orientation and/or position into a second orientation and/or position.

The control device 8 is configured to access or communicate with a data storage device 10 that can be assigned or is assigned to it in terms of hardware and/or software. The data storage device 10 is also shown in FIG. 1 as a purely exemplary structural component of the industrial robot 3.

The control device 8 is further configured to access or communicate with an output device 11 that can be assigned or is assigned to it. The output device 11 is also shown in FIG. 1 as a purely exemplary structural component of the industrial robot 3. However, the output device 11 could equally be a component of an end device (not shown), such as a computer, smartphone, tablet, etc. As will be seen in the following, the output device 11 is in particular an optical output device, i.e. a display, touch display, etc., which is configured to output optical information.

A method for controlling the operation of the machine 1, i.e. in particular the industrial robot 3, which can be implemented via the control device 8 is explained in more detail below:

As mentioned, the operation of the machine 1 is therefore based on control information, on the basis of which the machine 1, in particular partially or fully automated, carries out a respective task—this can be, as mentioned, a pick-and-place or singulation task on objects 2, for example. The corresponding control information is typically data that can be processed by data processing or computer-aided processing. In particular, corresponding control information is machine-readable data, e.g. in the form of CNC codes, G codes, opcodes, assembler codes, etc.

The control information can be generated via the control device 8. For this purpose, the control device 8 can, for example, be designed as a local or global computer device or comprise such a device.

The control information is generated on the basis of a plurality of task parameter types APT. The generation of control information is therefore based on output task parameter types APT, on the basis of which control information is generated for carrying out one or a plurality of specific tasks. The corresponding task parameter types are data that can be processed by data processing or computer-aided processing, which describe one or more task parameter types relating to the operation of the machine 1 for carrying out the respective task.

Respective task parameter types APT relate to or describe the operation of the machine 1 to carry out a particular task. A task to be actually carried out during operation of the machine 1 on the basis of respective control information can therefore be described at least partially, or if necessary completely, by the task parameter types APT. Each task parameter type APT can relate to one or a plurality of sub-aspects of a respective task to be carried out.

The number of respective task parameter types APT can be the same or different for different tasks or task classes in which the same or similar, but possibly different tasks to be achieved are grouped. Accordingly, a first task or task class can be described by a first number of task parameter types APT and another task or task class by a different number of task parameter types APT.

A task parameter type can, for example, relate to at least one functional element of a functional device of the machine 1, such as for example a handling element 6 of the handling device 7, to be used to carry out a respective task. By selecting a corresponding task parameter type, at least one functional element of the functional device of the machine 1 to be used for carrying out a respective task can therefore be defined. A corresponding task parameter type APT can be, for example, a first task parameter type APT1 of a predefinable or predefined query and/or selection sequence described in more detail in conjunction with FIGS. 2-10.

Alternatively or additionally, a task parameter type APT can relate to at least one object 2, in particular at least one object 2 to be transferred from a first state, i.e. in particular from a first orientation and/or position, to at least one further state, i.e. in particular to a further orientation and/or position, when carrying out a respective task. By selecting a corresponding task parameter type APT, at least one object 2 to be transferred from a first state to a further state during the execution of a respective task can be defined. A corresponding task parameter type APT can be a second task parameter type APT2 of the predefinable or predefined query and/or selection sequence described in further detail in conjunction with FIGS. 2-10.

Alternatively or additionally, a task parameter type APT can relate to at least one action to be carried out before carrying out a respective task. An action to be carried out before carrying out a respective task can be, for example, a detection of an object 2, wherein the task parameter type describes in particular at least one object detection parameter relating to the detection of at least one object 2 by means of a detection device 12, i.e. a camera device, for example. A corresponding object detection parameter can, for example, be: "vision system", "static position", etc. Alternatively or additionally, an action to be carried out before carrying out the task can be a feed of at least one object 2 to be transferred from a first state into at least one further state within the context of the task, wherein the task parameter type APT describes in particular at least one object feed parameter relating to the feed of an object 2, in particular into an action area of the industrial robot 3. A corresponding object feed parameter can, for example, be: "product bunker, "pick-up from belt", "pick-up from tray", etc. A corresponding task parameter type APT can be, for example, a third task parameter type APT3 of the predefinable or predefined query and/or selection sequence described in more detail below in conjunction with FIGS. 2-10.

Alternatively or additionally, a task parameter type APT can relate to at least one action to be carried out after carrying out the respective task. An action to be carried out after carrying out a respective task can be, for example, a detection of an object 2, wherein the task parameter type describes in particular at least one object detection parameter relating to the detection of at least one object 2 by means of a detection device (not shown), i.e. a camera device, for example. A corresponding object detection parameter can, for example, be: "vision system", "static position", etc. Alternatively or additionally, an action to be carried out after carrying out the task can be a storage of at least one object 2 transferred from a first state into at least one further state within the context of the task, wherein the task parameter type APT describes in particular at least one object placing parameter relating to the placing of an object 2, in particular in at least one placing area. A corresponding object placing parameter can, for example, be: "product bunker", "pick-up from belt", "pick-up from tray", etc. A corresponding task parameter type APT can for example be a fourth task parameter type APT4 of the predefinable or predefined query and/or selection sequence described in further detail in conjunction with FIGS. 2-10.

In all exemplary embodiments, the task parameter types APT are stored in the data storage device 10 in a linked manner based on predefined task parameter type-specific links, which are typically data links. The task parameter types APT are therefore available in the data storage device 10 as data linked together in a predefinable or predefined manner on the basis of corresponding predefinable or predefined task parameter type-specific links. Thus, each task parameter type APT is linked to at least one further task parameter type APT via corresponding predefinable or predefined task parameter type-specific links in a predefinable or predefined manner. The predefinable or predefined task parameter type-specific links of the respective task parameter types are generated on the basis of link criteria. Corresponding link criteria are selected such that they enable, for example, a meaningful link of task parameter types APT for a specific task or task class.

The predefined task parameter type-specific links of respective task parameter types APT typically cannot be changed by an operator or a user of the method, i.e. a person who wants to implement or program a control of the operation of the machine 1, for example. This is a particular advantage of the method, as an operator or user of the method can perform implementation or programming of a control of the operation of the machine 1 solely by selecting certain task parameter types APT linked in a predefined manner. This means that the implementation or programming of a control system for the operation of the machine 1 can be carried out in a simple manner.

A link criterion can be, for example, a compatibility or plausibility criterion. The task parameter type-specific links can therefore be generated on the basis of at least one compatibility or plausibility criterion that describes an, in particular technical, compatible or plausible link of a first task parameter type APT with at least one further task parameter type APT. In this way, it can be ensured that (only) compatible or plausible task parameter types APT can be linked and selected to generate control information; incompatible or implausible task parameter types cannot be linked and not selected to generate control information.

Furthermore, a link criterion can be a hierarchy criterion. The predefined task parameter type-specific links can therefore be generated on the basis of at least one hierarchy criterion that describes a hierarchically ordered link of a first task parameter type APT with at least one further task parameter type APT. In this way, it can be ensured that (only) hierarchically ordered task parameter types APT can be linked and selected to generate control information; non-hierarchically ordered task parameter types cannot be linked and not selected to generate control information.

Furthermore, a link criterion can be a safety criterion. The predefined task parameter type-specific links can therefore be generated on the basis of at least one safety criterion, which describes an ordered linking of a first task parameter type APT to at least one further task parameter type APT with regard to safety-relevant aspects of the operation of the machine 1, e.g. in connection with a possible damage or danger potential of users, objects, other machines, etc. In this way, it can be ensured that (only) task parameter types APT can be linked and selected to generate control information if these or their linking would result in safe operation of the machine; task parameter types cannot be linked and selected to generate control information if these or their linking would not result in safe operation of the machine 1.

A corresponding safety criterion can be defined on the basis of one or a plurality of safety limit values. Corresponding safety limit values can be defined with regard to a possible damage or danger potential of users, objects, other machines, etc.

Furthermore, a link criterion can be an efficiency criterion. The predefined task parameter type-specific links can therefore be generated on the basis of at least one efficiency criterion that describes a link of a first task parameter type APT to at least one further task parameter type APT ordered with regard to efficiency-relevant aspects of the operation of the machine 1. In this way, it can be ensured that (only) task parameter types APT can be linked and selected to generate control information if these or their linking would result in efficient operation of the machine 1—this can be, for example, efficient operation of the machine with regard to the energy, time, etc. required to carry out the respective task; task parameter types APT cannot be linked and selected to generate control information if these or their linking would not result in efficient operation of the machine 1. A corresponding efficiency criterion can be defined on the basis of one or a plurality of efficiency limit values.

The task parameter types APT linked via predefined task parameter type-specific links can be output to a user via the or a respective output device 11 in at least one item of output information containing the predefined task parameter type-specific links, in particular optically or visually depicting them. Corresponding output information can form a (graphical) user interface (GUI) or a component of such. A corresponding user interface can—as shown in FIGS. 2-10—include or result in, for example, a tree structure that maps the predefined task parameter type-specific links of the task parameter types APT for at least one specific task.

FIGS. 2-10 show examples of output information that can be output via a corresponding output device 11 or via an associated output or display surface. It can be seen from FIGS. 2-10 that the task parameter types APT linked via predefined task parameter type-specific links can be output to a user via the output device 11 in a predefinable or predefined query and/or selection sequence for query and/or selection.

As can be seen in connection with the further explanations of FIGS. 2-10, a corresponding output essentially comprises the task parameter types APT in the predefinable or predefined query and/or selection sequence the following steps:

outputting a number of first task parameter types APT1 via the output device 11;

selecting a particular first task parameter type APT1 from the number of first task parameter types APT1 output via the output device 11;

outputting a number of further task parameter types APTn linked to the first task parameter types APT1 via the output device 11; and selecting a particular further task parameter type APTn from the number of further task parameter types APTn output via the output device 11.

Corresponding further task parameter types APTn can have a lower position in the query and/or selection sequence compared to first task parameter types APT1.

This principle can be continued as desired, as shown in FIGS. 2-10.

FIGS. 2-10 also show that selection menus, e.g. drop-down menus, can be generated and output for querying and/or selecting respective task parameter types APT linked on the basis of the task parameter type-specific links. Thus, the query and/or selection of respective task parameter types APT can be performed via intuitively operable selection menus, which form part of a (graphical) user interface (GUI) that can be output via the output device 11.

Figure 2:
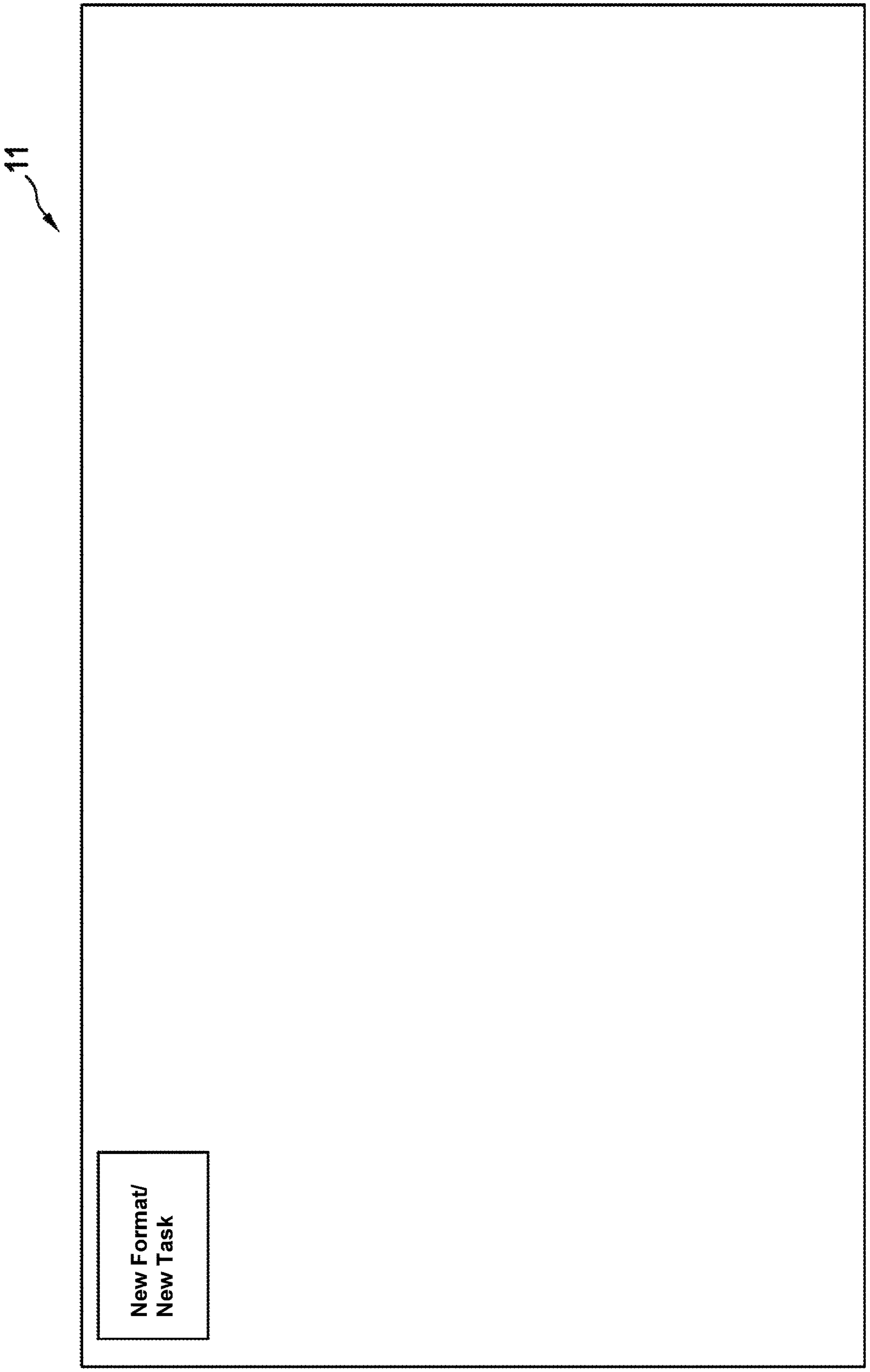
FIG. 2 is a schematic diagram of an output information generated in the course of performing a method according to an exemplary embodiment.

FIG. 2 shows, in conjunction with an exemplary user interface that can be output via the output device 11, first of all a conceivable first display that can be output, which offers a user a selection option for initiating a query of task parameter types APT serving to generate control information for a new task—in a purely exemplary manner designated by "New format/new task".

Figure 3:
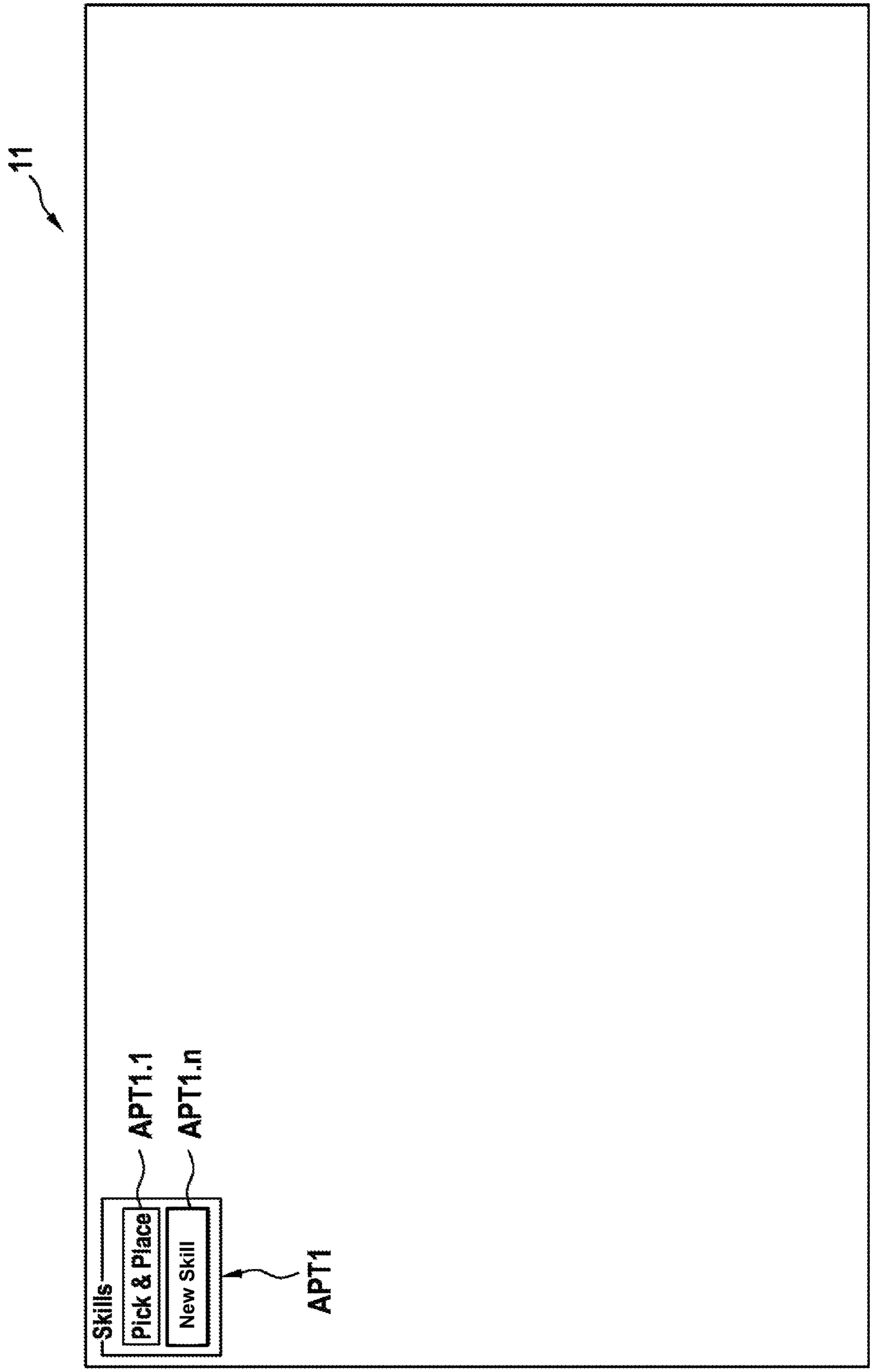
FIG. 3 is a schematic diagram of an output information generated in the course of performing a method according to an exemplary embodiment.

After exemplary selection or confirmation of the element "New format/new task", the display shown in FIG. 3 is generated, which offers a user or operator a selection option of a first task parameter type APT1 in a selection menu indicated by the corresponding box. The first task parameter type APT1, entitled "Skills" in FIG. 3 as an example, can generally relate to the type or class of the task to be carried out. The task parameter types that can be selected by way of example in the exemplary embodiment are "Pick & place" (APT1.1), i.e. task parameter types in connection with a pick-and-place or singulation task, and "New skill" (APT**1.*n***), i.e. task parameter types in conjunction with another task that is not described further here because it is not essential for the explanation of the principle.

Figure 4:
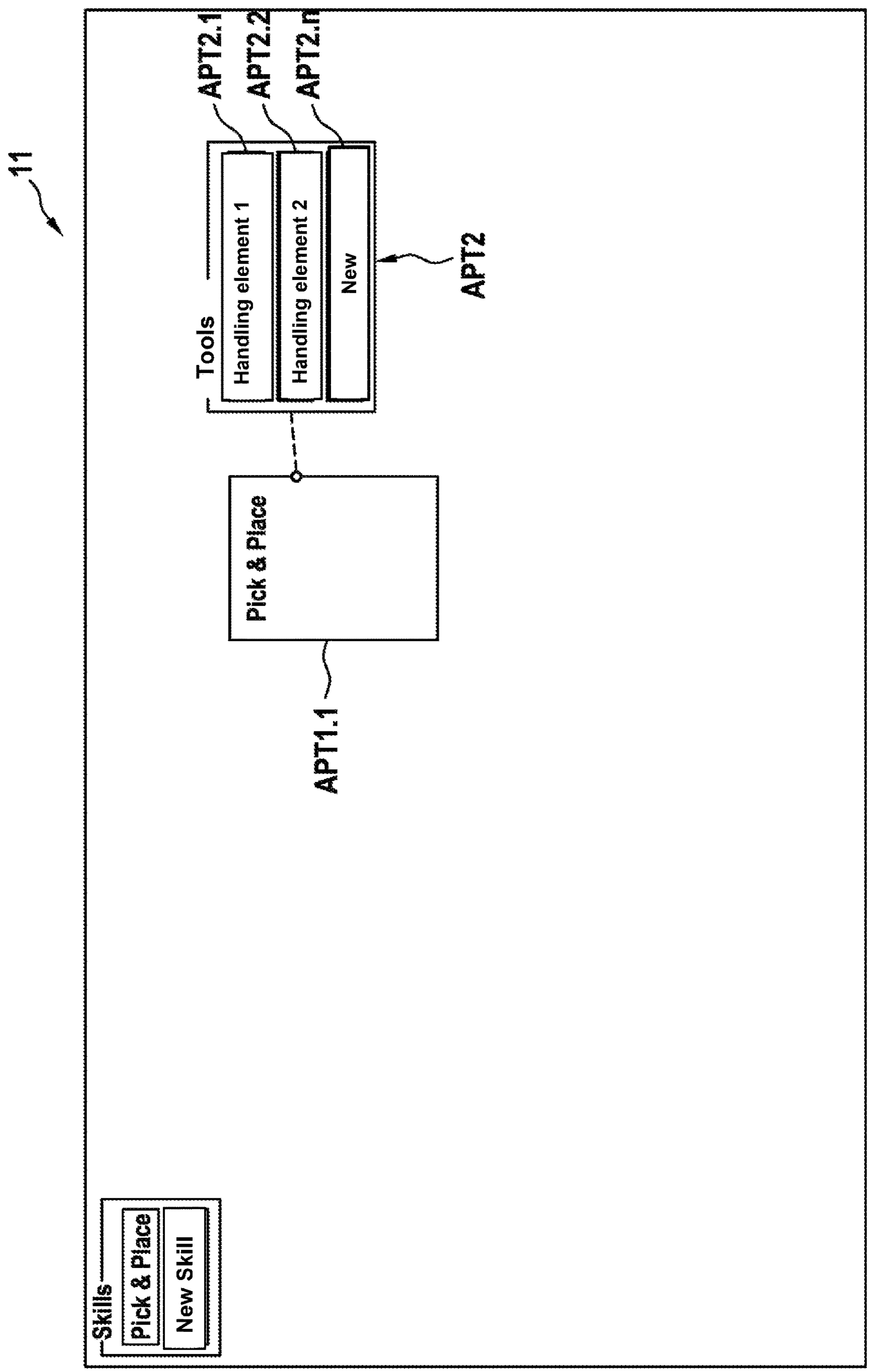
FIG. 4 is a schematic diagram of an output information generated in the course of performing a method according to an exemplary embodiment.

After exemplary selection or confirmation of the task parameter type APT1.1 "Pick & place", the display shown in FIG. 4 is generated, which offers a user a selection option of a second task parameter type APT2 in a selection menu indicated by the corresponding box. The second task parameter type APT2, entitled "Tools" in FIG. 4 as an example, may generally relate to the type or class of handling elements (tools) to be used in connection with the selected task. The task parameter types that can be selected by way of example in the exemplary embodiment are "Handling element 1" (APT2.1), "Handling element 2" (APT2.2), and "New" (APT**2.*n*), i.e. task parameter types in connection with another handling element that is not described further here because it is not essential for the explanation of the principle. The handling element 1 can be a suctioning element, for example, while the handling element 2 can be a gripping element, for example. It is obvious that the task parameter types APT2 that can be selected in FIG. 4 are linked to the task parameter types APT1 that can be selected in FIG. 3**.

Figure 5:
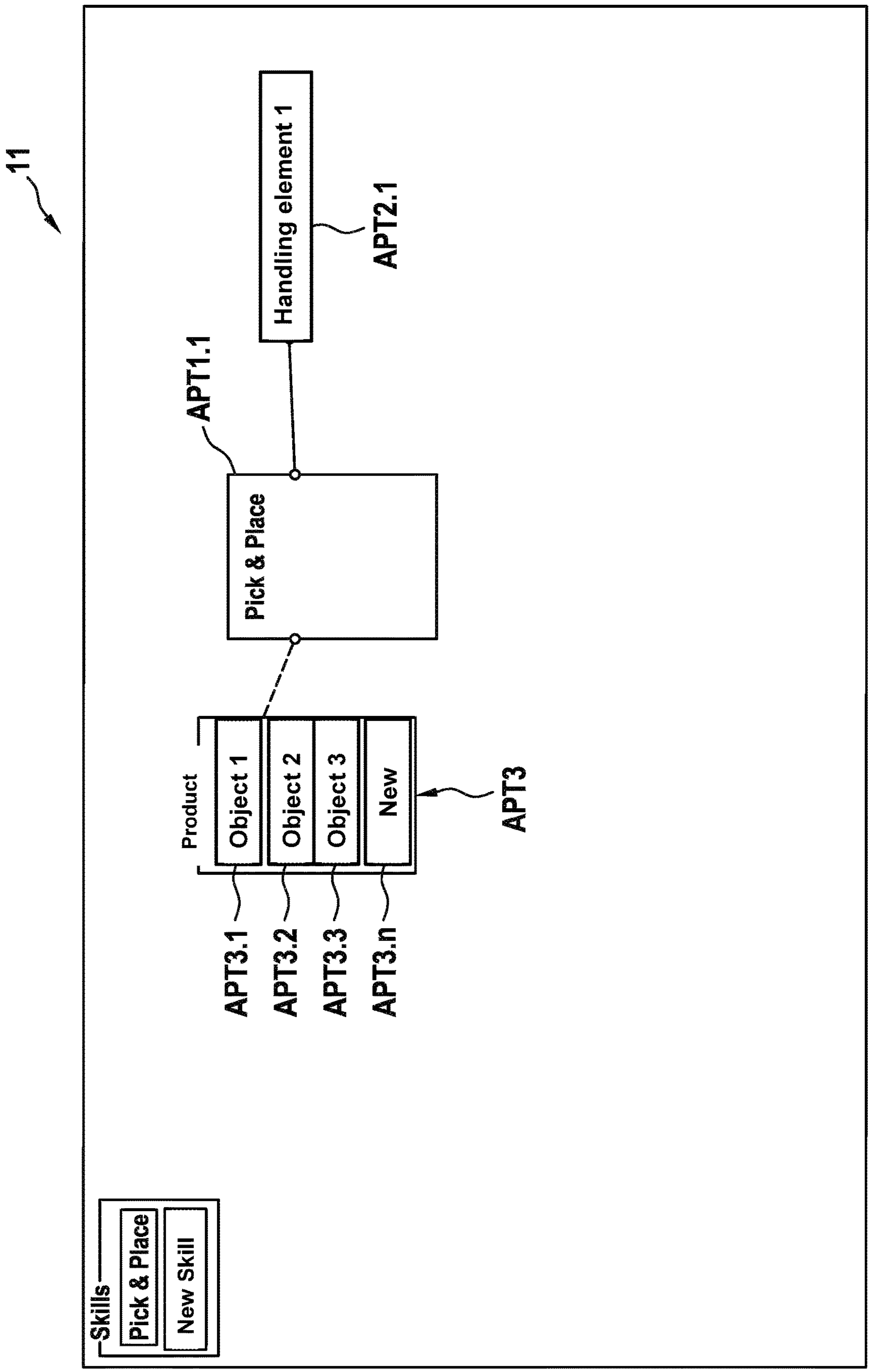
FIG. 5 is a schematic diagram of an output information generated in the course of performing a method according to an exemplary embodiment.

After exemplary selection or confirmation of the task parameter type APT2.1 "Handling element 1", the display shown in FIG. 5 is generated, which offers a user a selection option of a third task parameter type APT3 in a selection menu indicated by the corresponding box. The second task parameter type APT3, entitled "Product" in FIG. 5 as an example, may generally relate to the type or class of objects 2 (products) to be handled in connection with the selected task. The task parameter types that can be selected by way of example in the exemplary embodiment are "Object 1" (APT3.1), "Object 2" (APT3.2), and "Object 3" (APT3.3), i.e. task parameter types in connection with another object that is not described further here because it is not essential for the explanation of the principle. Object 1 may be, for example, a chocolate bar, object 2 may be, for example, another chocolate bar and object 3 may be, for example, another sweet treat, such as a biscuit. The same applies, of course, to any other objects. It is obvious that the task parameter types APT3 that can be selected in FIG. 5 are linked to the task parameter types that can be selected in above figures.

Figure 6:
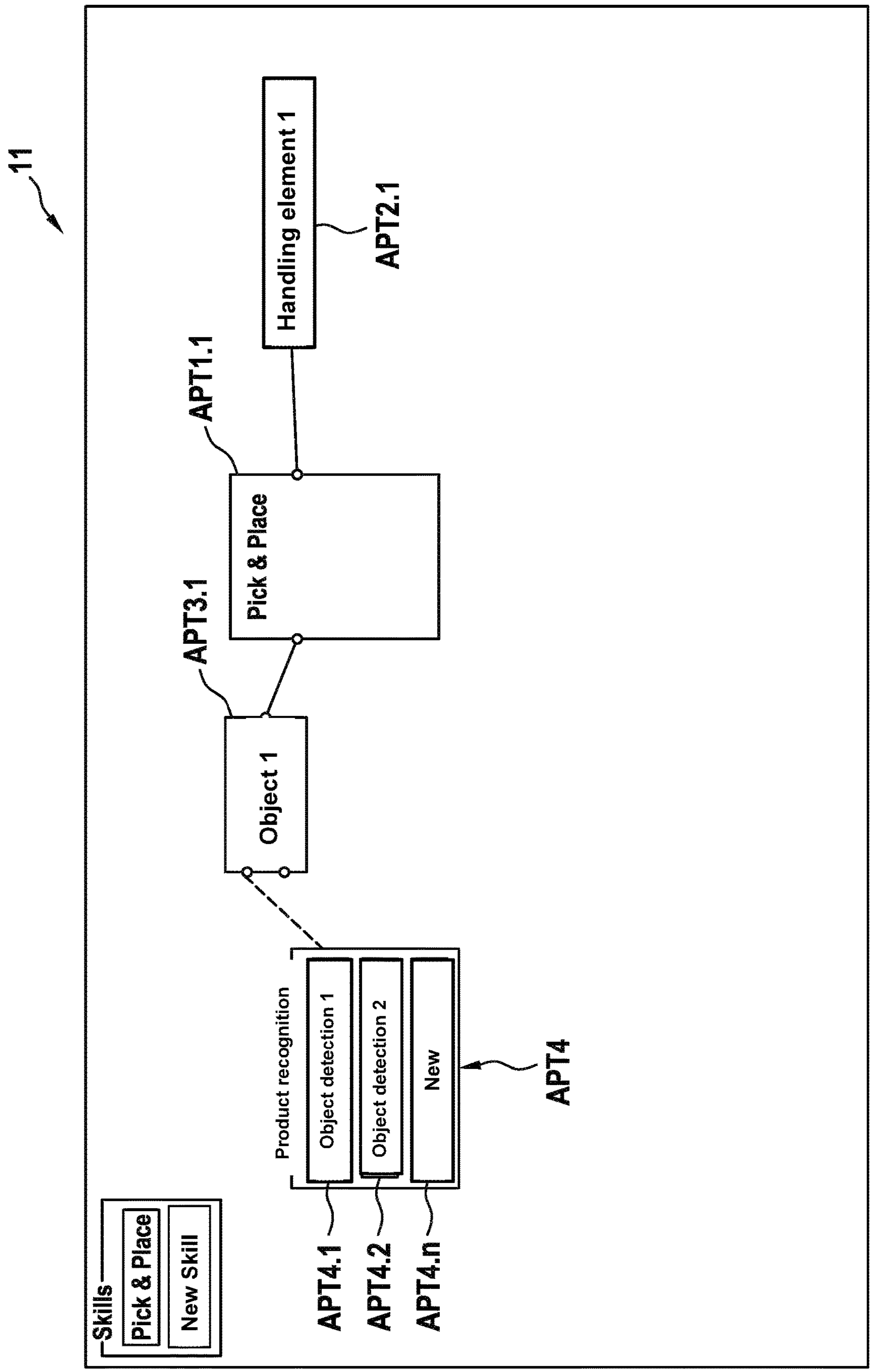
FIG. 6 is a schematic diagram of an output information generated in the course of performing a method according to an exemplary embodiment.

After exemplary selection or confirmation of the task parameter type APT3.1 "Object 1", the display shown in FIG. 6 is generated, which offers a user a selection option of a fourth task parameter type APT4 in a selection menu indicated by the corresponding box. The fourth task parameter type APT 4, which is headed "Product identification" in FIG. 6 as an example, can describe at least one object detection parameter relating to the detection of at least one object 2 to be transferred from a first state to at least one further state by means of a detection device within the context of carrying out the task. The task parameter types that can be selected by way of example in the exemplary embodiment are "Object detection 1" (APT4.1), "Object detection 2" (APT4.2), and "New" (APT**4.*n*), i.e. task parameter types in connection with another object detection that is not described further here because it is not essential for the explanation of the principle. It is obvious that the task parameter types APT4 that can be selected in FIG. 6** are linked to the task parameter types that can be selected in above figures.

Figure 7:
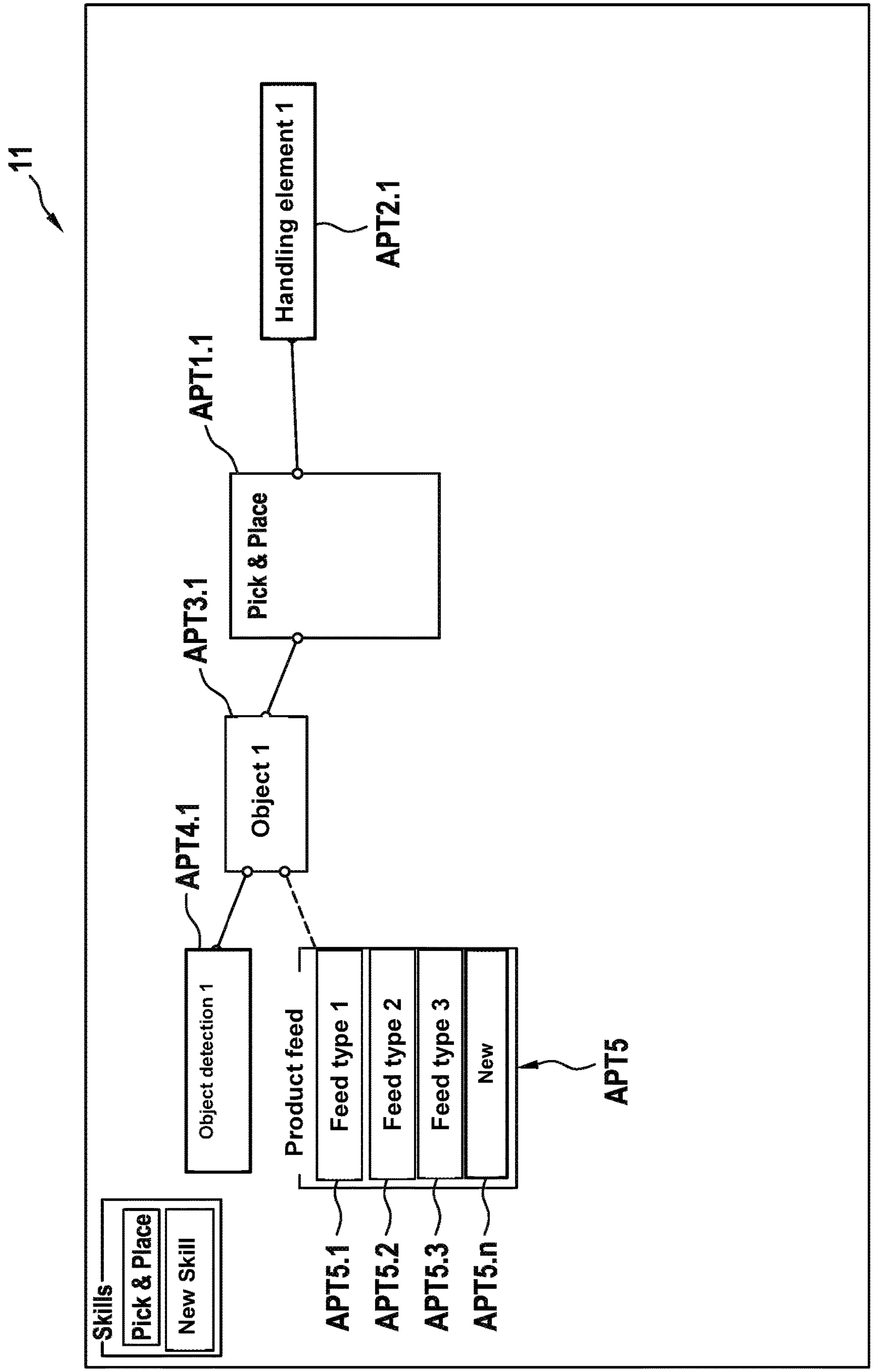
FIG. 7 is a schematic diagram of an output information generated in the course of performing a method according to an exemplary embodiment.

After exemplary selection or confirmation of the task parameter type APT4.1, "Object detection 1", the display shown in FIG. 7 is generated, which offers a user a selection option of a fifth task parameter type APT5 in a selection menu indicated by the corresponding box. The fifth task parameter type APT5, which is headed "Product feed" in FIG. 7 as an example, can describe at least one type of feed of an object 2 into an action area of the machine 1 or the industrial robot 3. The task parameter types that can be selected by way of example in the exemplary embodiment are "Feed 1" (APT5.1), "Feed 2" (APT5.2), "Feed 3" (APT5.3) and "New" (APT**5.*n*), i.e. task parameter types in connection with another object detection that is not described further here because it is not essential for the explanation of the principle. The feed type 1 can, for example, be: no feed, while the feed type 2 can, for example, be: removal of the object 2 from a bunkers, while the feed type 3 can, for example, be: removal of the object 2 from a feed belt. It is obvious that the task parameter types APT5 that can be selected in FIG. 7** are linked to the task parameter types that can be selected in above figures.

Figure 8:
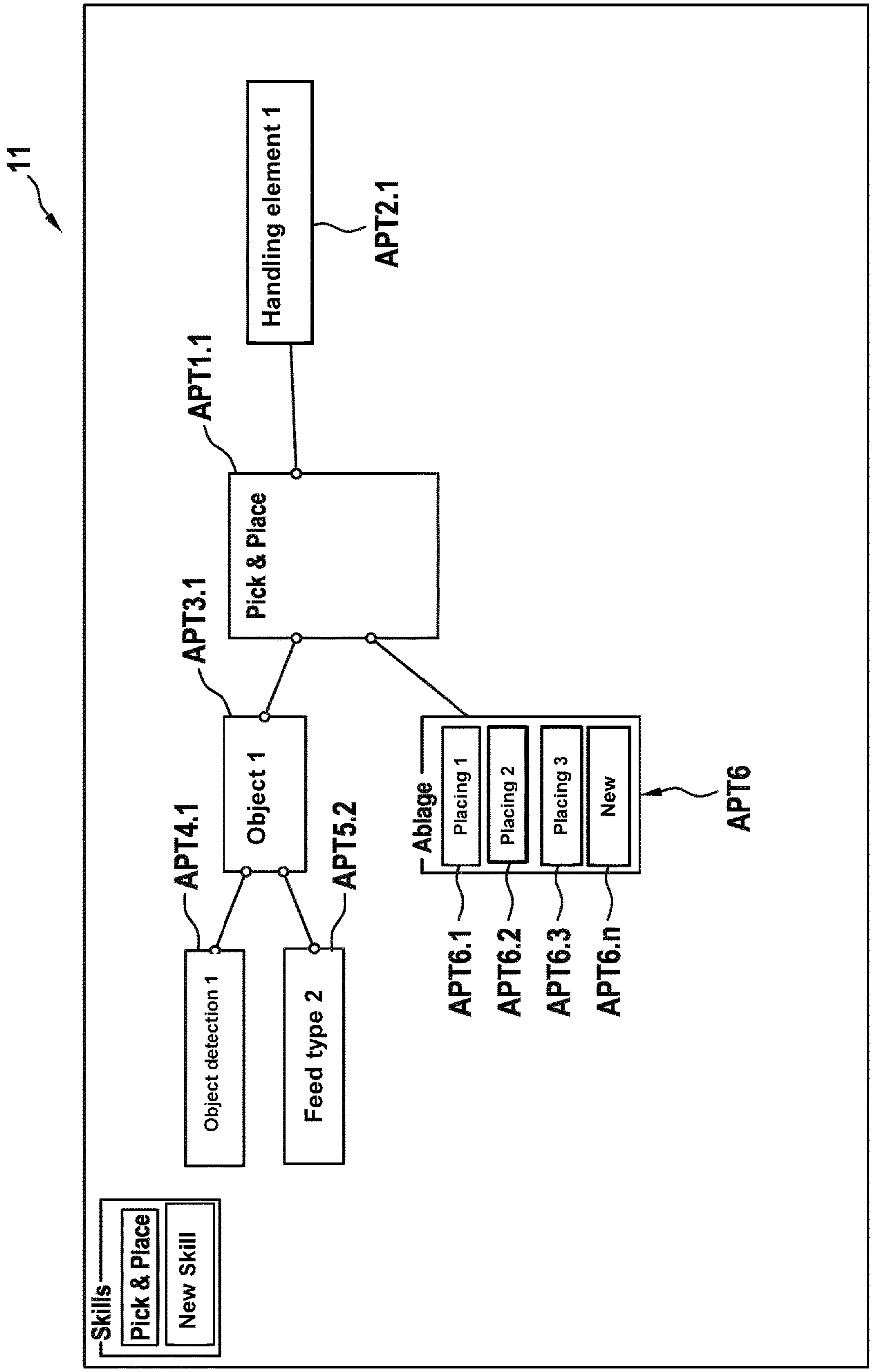
FIG. 8 is a schematic diagram of an output information generated in the course of performing a method according to an exemplary embodiment.

After exemplary selection or confirmation of the task parameter type APT5.2 "Feed type 2", the display shown in FIG. 8 is generated, which offers a user a selection option of a sixth task parameter type APT6 in a selection menu indicated by the corresponding box. The sixth task parameter type APT6, which is headed "Placing" in FIG. 8 as an example, can describe at least one type of outlet of an object 2 from an action area of the machine 1 or the industrial robot 3. The task parameter types that can be selected by way of example in the exemplary embodiment are "Placing 1" (APT6.1), "Placing 2" (APT6.2), "Placing 3" (APT6.3) and "New" (APT.*n*), i.e. task parameter types in connection with another object detection that is not described further here because it is not essential for the explanation of the principle. Placing 1 can be, for example, a fixed placing position, Placing 2 can be, for example, placing in a first placing tray, while Placing 3 can be, for example, placing in another placing tray. It is obvious that the task parameter types APT6 that can be selected in FIG. 8 are linked to the task parameter types that can be selected in above figures.

Figure 9:
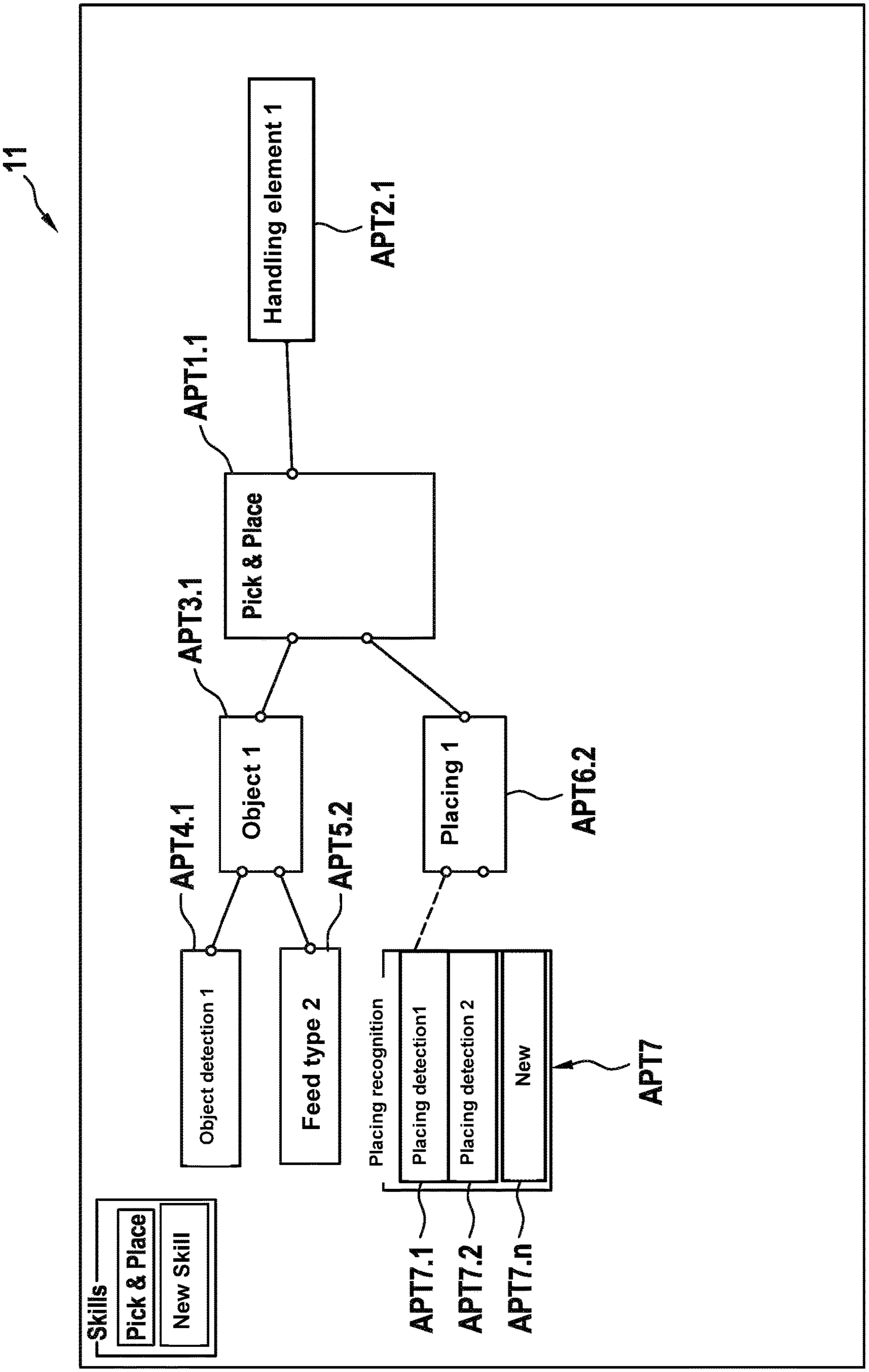
FIG. 9 is a schematic diagram of an output information generated in the course of performing a method according to an exemplary embodiment.

After exemplary selection or confirmation of the task parameter type APT6.2 "Placing 2", the display shown in FIG. 9 is generated, which offers a user a selection option of a seventh task parameter type APT7 in a selection menu indicated by the corresponding box. The seventh task parameter type APT7, which is headed "Placing identification" in FIG. 9 as an example, can describe at least one object detection parameter relating to the detection of at least one object 2 transferred from a first state to at least one further state by means of a detection device within the context of carrying out the task. The task parameter types that can be selected by way of example in the exemplary embodiment are "Placing detection 1" (APT7.1), "Placing detection 2" (APT7.2), and "New" (APT7.*n*), i.e. task parameter types in connection with another object detection that is not described further here because it is not essential for the explanation of the principle. It is obvious that the task parameter types APT7 that can be selected in FIG. 9 are linked to the task parameter types that can be selected in above figures.

FIGS. 2-9 show that by selecting the respective task parameter types APT1—APT7 one after the other, a tree structure can be created that not only shows the specifically selected task parameter types, but also the task parameter type-specific link of the task parameter types APT1—APT7. This link means that after a selection of task parameter type 1, only a selection of task parameter type 2 is possible, and so on.

The principle described in connection with FIGS. 2-9 for a task of a machine 1 can be extended as desired to the generation of control information for a plurality of, possibly interacting, machines 1.

Figure 10:
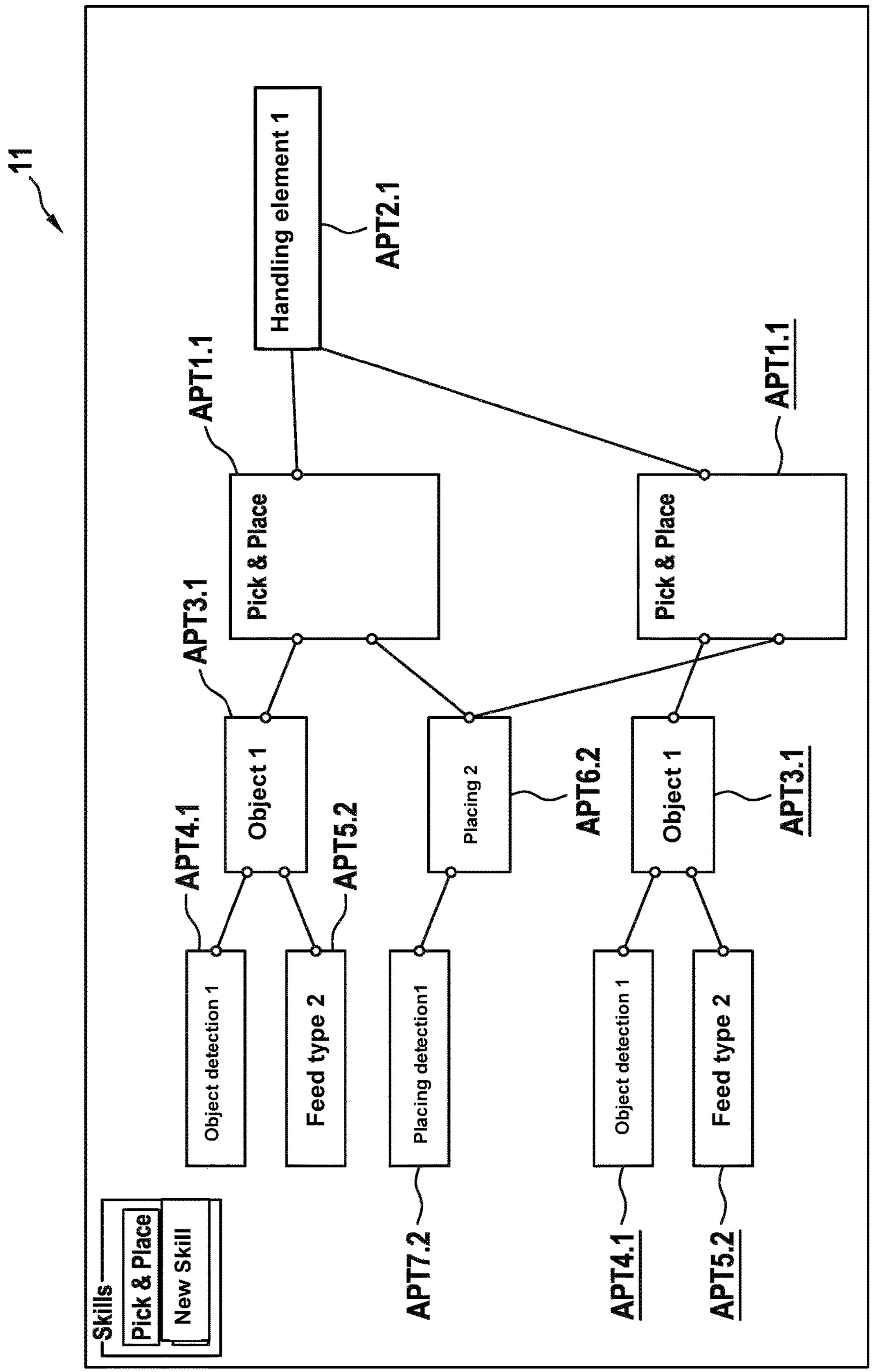
FIG. 10 is a schematic diagram of an output information generated in the course of performing a method according to an exemplary embodiment.

FIG. 10 shows a purely exemplary tree structure according to which task parameter types for a plurality of machines 1 are linked to one another. The exemplary task parameter types assigned to the operation of a first machine 1 are shown without underlining, while the task parameter types assigned to the operation of a further machine are shown with underlining.

FIG. 10 also shows that one or a plurality of task parameter types can be assigned to the operation of a plurality of different machines.

Also in this context, the respective control information is generated based on a plurality of task parameter types relating to the operation of the plurality of machines 1 to carry out the respective at least one task. Thus, a number of first task parameter types relate to the operation of the at least one first machine 1 for carrying out the task to be carried out by means of the at least one first machine 1, and a number of further task parameter types relate to the operation of at least one further machine for carrying out the task to be carried out by means of the at least one further machine 1, wherein the further task parameter types are linked to the first task parameter types on the basis of the predefined task parameter type-specific links.

In all exemplary embodiments, an output of corresponding output information can also be understood as a transmission of this to one or more communication partners. The transmission of corresponding output information can be realized via wired or wireless data transmission connections. A corresponding communication partner can in turn be, for example, a user or user-side (mobile) end device, such as a computer, in particular a laptop, a smartphone, a tablet, etc. It is also conceivable that a communication partner is a server connected to a local or global communication network.

The invention claimed is:

1. A method for controlling operation of at least one machine configured to carry out pick-and-place or singulation tasks on one or more objects, wherein the at least one machine comprises at least one functional device that comprises at least one functional element for carrying out at least one task for carrying out at least one pick-and-place or singulation task on the one or more objects, the method comprising:

displaying a first selection menu on a graphical user interface via at least one output device, the first selection menu including a first selection option corresponding to a first task parameter type concerning the task for carrying out the at least one pick-and-place or singulation task on the one or more objects;

in response to receiving a user selection of the first selection option of the first selection menu, displaying a second selection menu including a second selection option on the graphical user interface via the at least one output device, wherein the second selection option corresponds to a second task parameter type concerning the task for carrying out the at least one pick-and-place or singulation task on the one or more objects, wherein the first task parameter type and the second task parameter type are stored on at least one data storage device in a predefined linked manner on the basis of at least one hierarchy criterion that describes a hierarchically ordered link of the first task parameter type to the second task parameter type such that the second selection option is displayed and selectable in response to user selection of the first selection option and such that only task parameter types within a set of predefined linked task parameter types can be linked and selected to generate control information for carrying out the at least one pick-and-place or singulation task on the one or more objects; and controlling the operation of the at least one machine on the basis of control information in order to carry out the at least one task for carrying out the at least one pick-and-place or singulation task on the one or more objects, wherein the control information is generated on the basis of the first task parameter type and the second task parameter type that relate to the operation of the at least one machine in order to carry out the at least one task for carrying out the at least one pick-and-place or singulation task on the one or more objects.

2. The method according to claim 1, wherein the first task parameter type and the second task parameter type are linked on the basis of at least one safety criterion that describes an ordered link of the first task parameter type to the second task parameter type with regard to safety-relevant aspects of the operation of the machine.

3. The method according to claim 1, wherein the first task parameter type and the second task parameter type are linked on the basis of at least one efficiency criterion that describes an ordered link of the first task parameter type to the second task parameter type with regard to efficiency-relevant aspects of the operation of the machine.

4. The method according to claim 1, wherein a task parameter type relates to the at least one functional element of the functional device to be used for carrying out the task.

5. The method according to claim 1, wherein a task parameter type relates to at least one object to be transferred from a first state to at least one further state within the context of carrying out the task.

6. The method according to claim 1, wherein a task parameter type relates to at least one action to be carried out before carrying out the task.

7. The method according to claim 6, wherein:

an action to be performed before carrying out the task is a detection of an object, wherein the task parameter type describes at least one object detection parameter relating to the detection of at least one object to be transferred from a first state to at least one further state by means of a detection device in the course of carrying out the task; or an action to be carried out before carrying out the task is a feed of at least one object to be transferred from a first state into at least one further state within the context of the task, wherein the task parameter type describes at least one object feed parameter relating to the feed of an object into an action area of the at least one industrial robot.

8. The method according to claim 1, wherein a task parameter type relates to at least one action to be carried out after carrying out the task.

9. The method according to claim 8, wherein:

an action to be carried out after carrying out the task is a detection of an object, wherein the task parameter type describes at least one object detection parameter relating to the detection of at least one object transferred from a first state to at least one further state by means of a detection device in the course of carrying out the task; or an action to be carried out after carrying out the task is a placing of at least one object transferred from a first state into at least one further state within the context of the task, wherein the task parameter type describes at least one object placing parameter relating to the placing of an object in at least one placing area.

10. The method according to claim 1, wherein a plurality of machines is controlled, wherein control of the plurality of machines to respectively carry out at least one task is controlled based on control information generated based on a plurality of task parameter types relating to operation of the plurality of machines to carry out the respective at least one task.

11. The method according to claim 10, wherein a number of first task parameter types relate to the operation of the at least one first machine for carrying out the task to be carried out by means of the at least one first machine, and a number of further task parameter types relate to operation of at least one further machine for carrying out the task to be carried out by means of the at least one further machine, wherein the further task parameter types are linked to the first task parameter types on the basis of predefined task parameter type-specific links.

12. The method according to claim 1, wherein the output device is an optical output device.

13. The method according to claim 1, wherein at least one of the first selection menu or the second selection menu is a drop-down menu.

14. The method according to claim 1, wherein a handling device of a collaborative industrial robot comprising at least one handling element that can be moved in at least one degree of freedom of movement, is used as the functional device of the at least one machine.

15. At least one machine for carrying out at least one pick-and-place or singulation task on one or more objects comprising:

the at least one functional device that comprises the at least one functional element for carrying out at least one task for carrying out the at least one pick-and-place or singulation task on the one or more objects, and at least one control device implemented in hardware and/or software, for controlling the operation of the at least one machine on the basis of the control information, wherein the control device is configured for carrying out the method according to claim 1.

16. The method of claim 1, wherein the hierarchically ordered link of the first task parameter type to the second task parameter type cannot be changed by a user of the method.

17. The method of claim 1, further comprising displaying a tree structure on the graphical user interface, the tree structure comprising:

the first selection menu including the first selection option;

the second selection menu including the second selection option; and a graphical link between the first selection menu and the second selection menu.

* * * * *